(12) United States Patent
Araki et al.

(10) Patent No.: US 9,367,165 B2
(45) Date of Patent: Jun. 14, 2016

(54) DISPLAY DEVICE

(71) Applicant: Japan Display Inc., Tokyo (JP)

(72) Inventors: Shigesumi Araki, Tokyo (JP); Mitsutaka Okita, Tokyo (JP); Kazuhiro Nishiyama, Tokyo (JP); Yoshitoshi Kida, Tokyo (JP); Koji Ishizaki, Tokyo (JP); Kohei Azumi, Tokyo (JP); Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/508,224

(22) Filed: Oct. 7, 2014

(65) Prior Publication Data

US 2015/0097192 A1    Apr. 9, 2015

(30) Foreign Application Priority Data

Oct. 8, 2013   (JP) .................. 2013-211293

(51) Int. Cl.
| | |
|---|---|
| *G06F 3/041* | (2006.01) |
| *G02F 1/1362* | (2006.01) |
| *G02F 1/1343* | (2006.01) |
| *G02F 1/1345* | (2006.01) |

(52) U.S. Cl.
CPC ........ *G06F 3/0412* (2013.01); *G02F 1/136286* (2013.01); *G02F 2001/13456* (2013.01); *G02F 2001/134372* (2013.01); *G06F 2203/04103* (2013.01)

(58) Field of Classification Search
CPC .............. G02F 2001/134318; G02F 1/134327; G02F 2001/134336; G02F 2001/134345; G02F 2001/134372; G02F 1/34309; G02F 1/134363; G02F 1/136286; G06F 3/0412
USPC ............................................... 439/12; 349/12
See application file for complete search history.

(56) References Cited

U.S. PATENT DOCUMENTS

| | | | |
|---|---|---|---|
| 8,217,913 B2 | 7/2012 | Hotelling et al. | |
| 8,786,557 B2 | 7/2014 | Noguchi et al. | |
| 8,937,690 B2 * | 1/2015 | Nam ................. | G02F 1/136286 345/173 |
| 2013/0250225 A1 | 9/2013 | Maeda et al. | |
| 2014/0152613 A1 | 6/2014 | Ishizaki et al. | |
| 2014/0152616 A1 | 6/2014 | Kida et al. | |

FOREIGN PATENT DOCUMENTS

| | | |
|---|---|---|
| JP | 2009-244958 A | 10/2009 |
| JP | 2010-231773 A | 10/2010 |
| JP | 2014-109904 A | 6/2014 |
| JP | 2014-132446 A1 | 7/2014 |
| WO | 2012/073792 A1 | 6/2012 |

\* cited by examiner

*Primary Examiner* — Jose R Diaz
(74) *Attorney, Agent, or Firm* — Typha IP LLC

(57) ABSTRACT

A display device is configured that the common electrode wiring layer is divided in a source wiring layer direction, the metal wiring layer is disposed above the source wiring layer at a position in contact with the upper part of the common electrode wiring layer, and the metal wiring layer is not disposed at a position where the common electrode wiring layer is divided. Alternatively, the metal wiring layer is not disposed at a position between the same colors as those at the division position of the common electrode wiring layer.

14 Claims, 16 Drawing Sheets

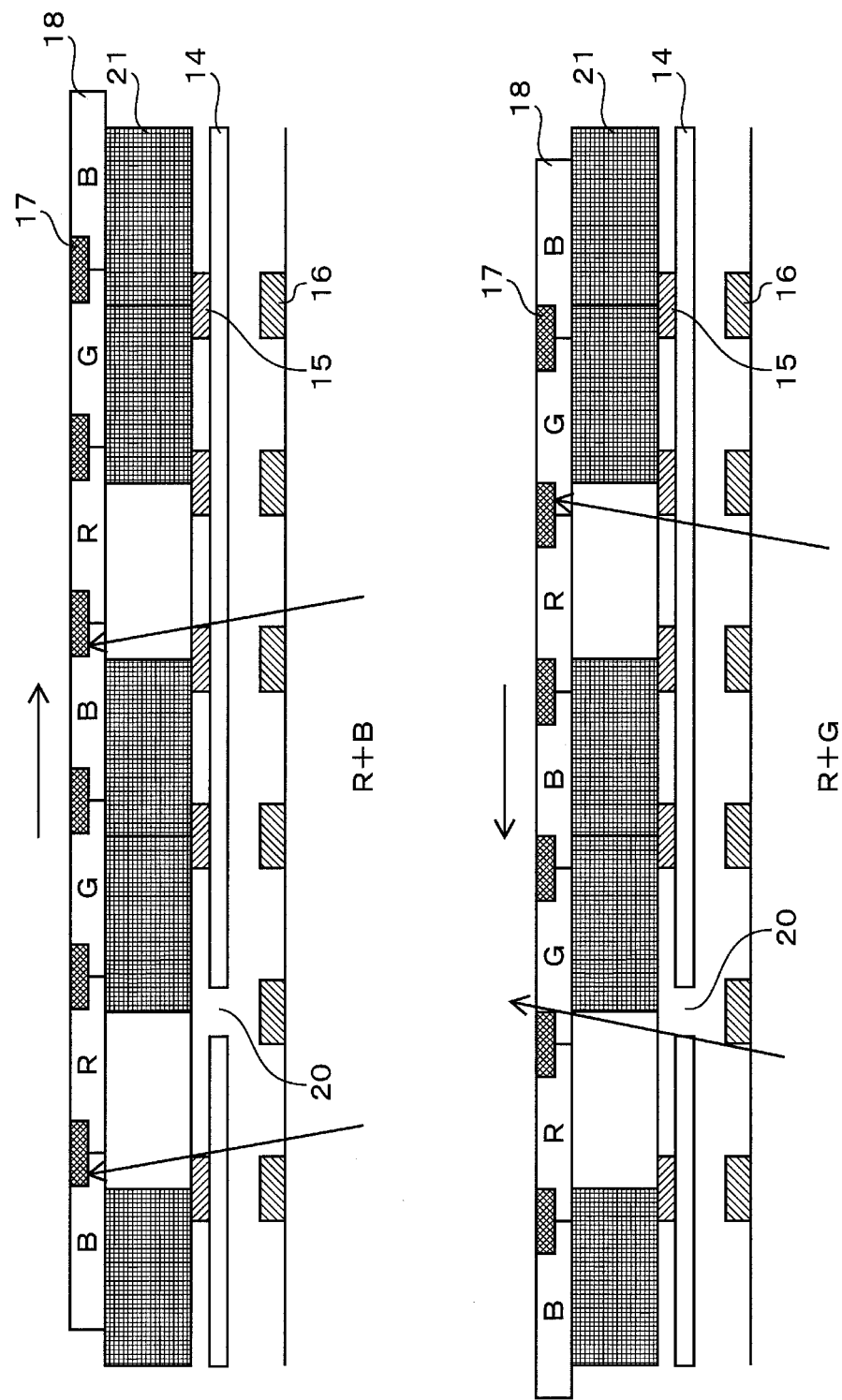

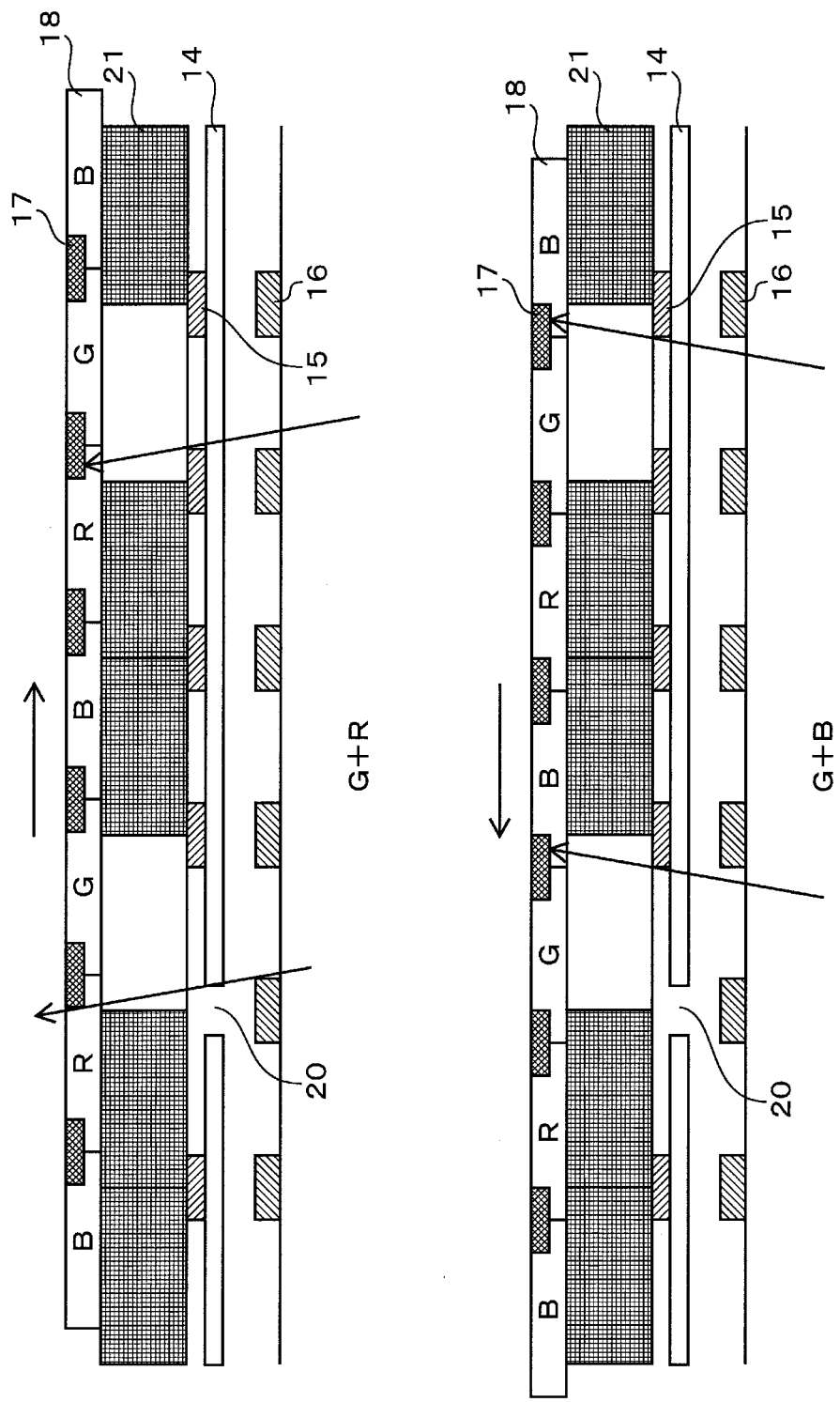

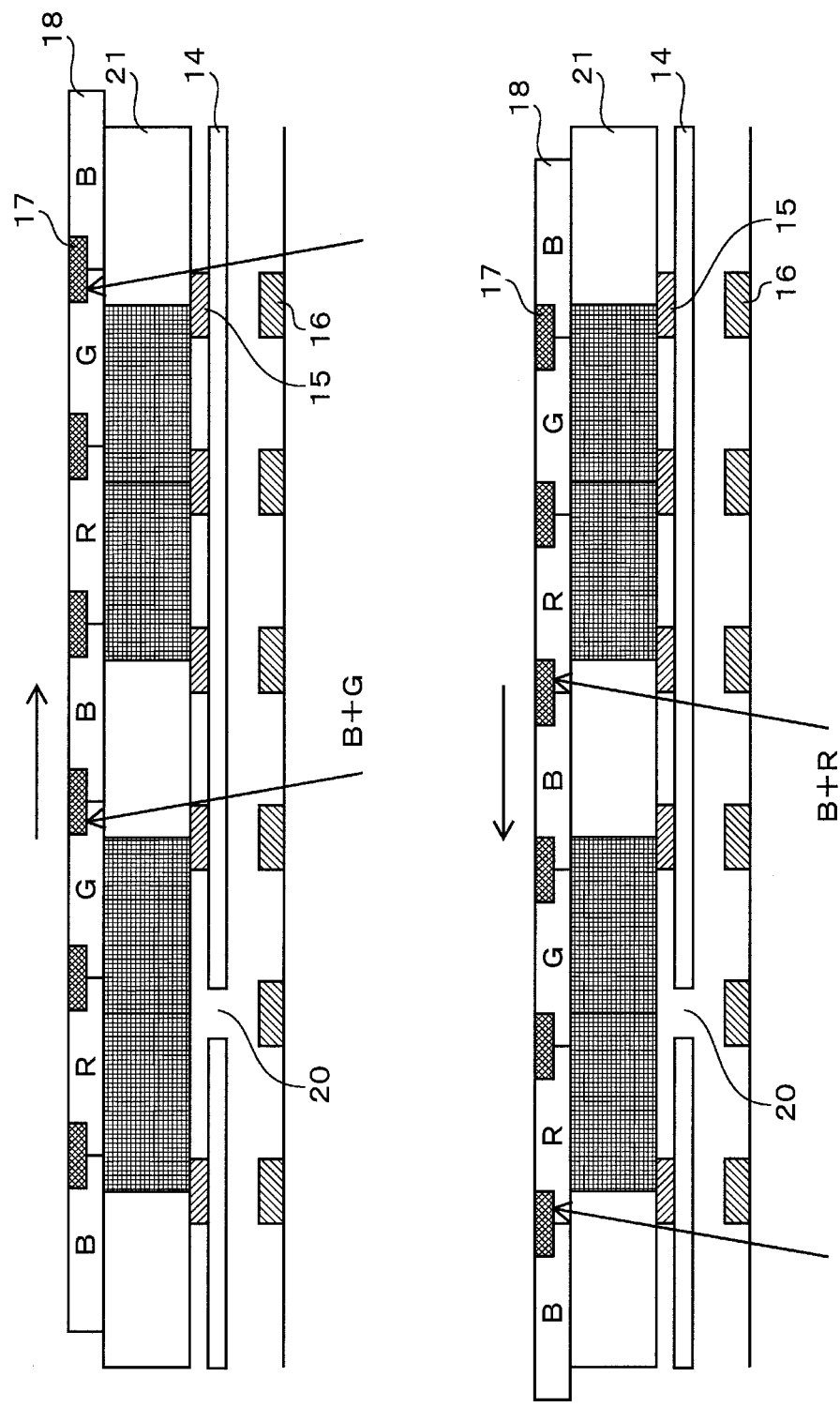

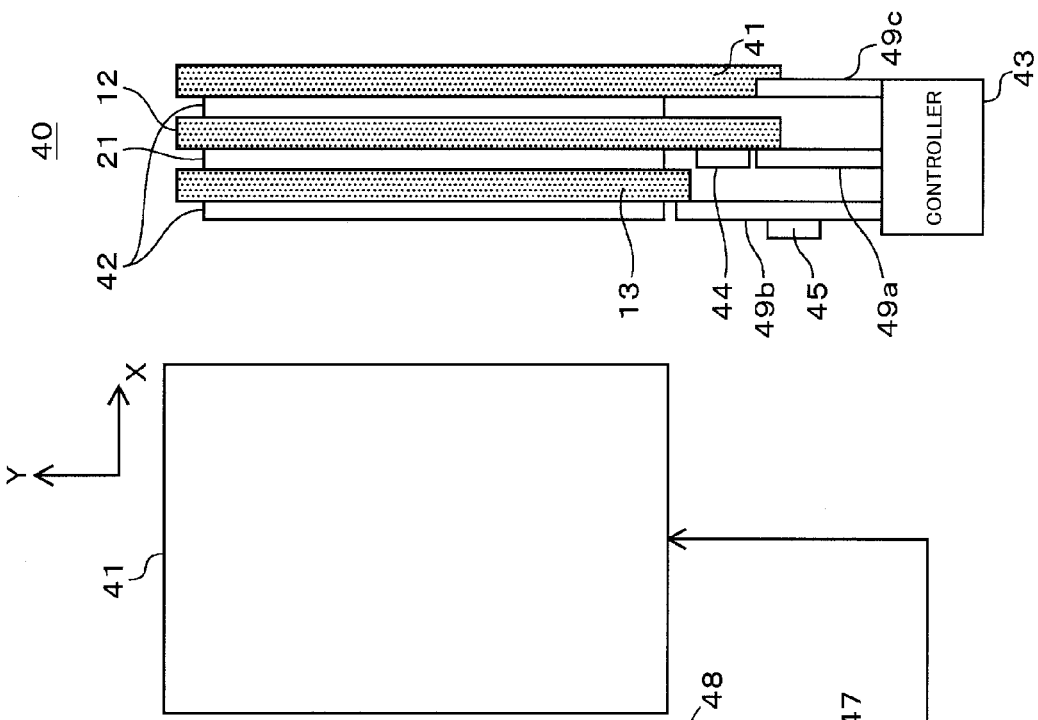
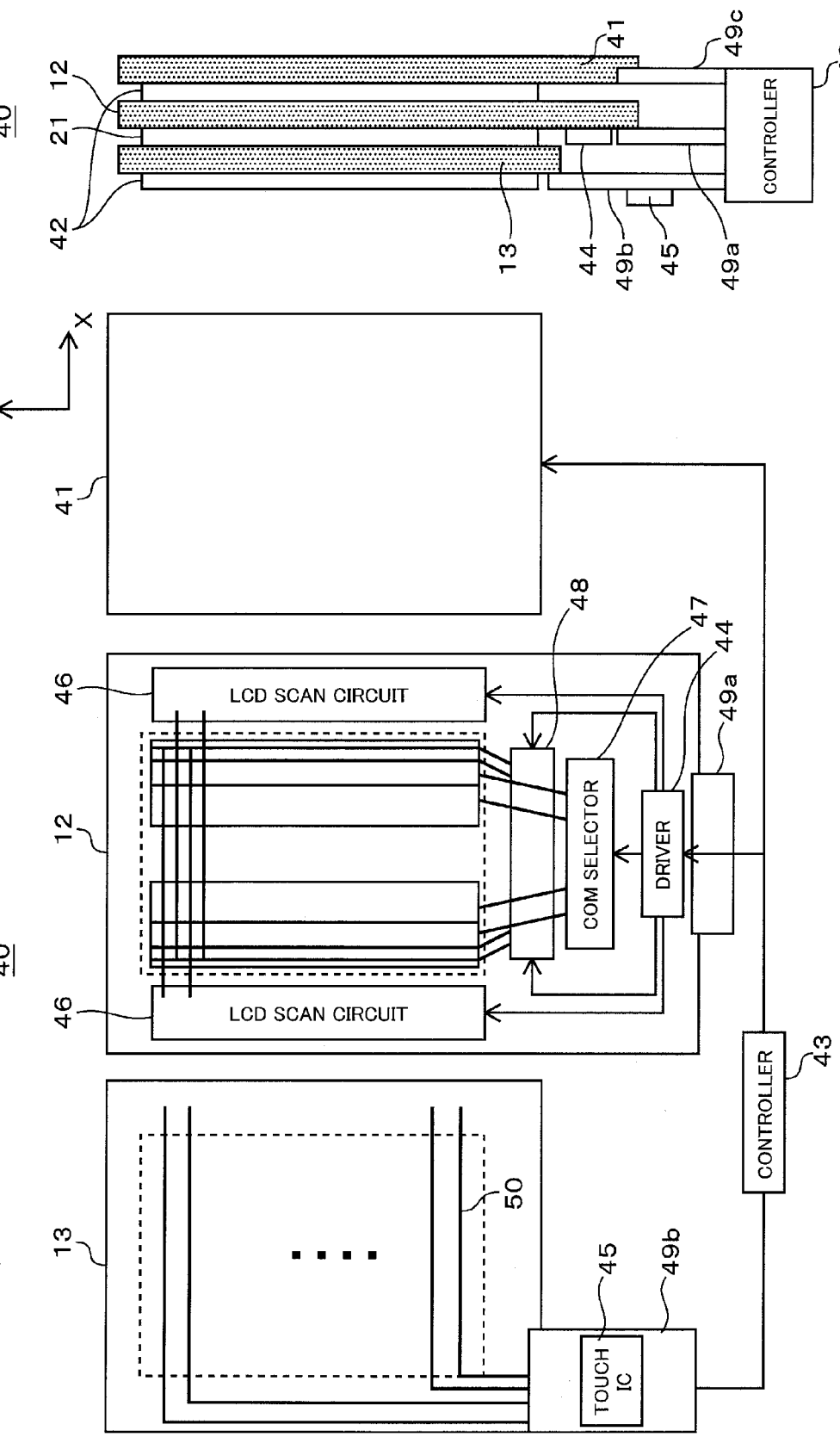

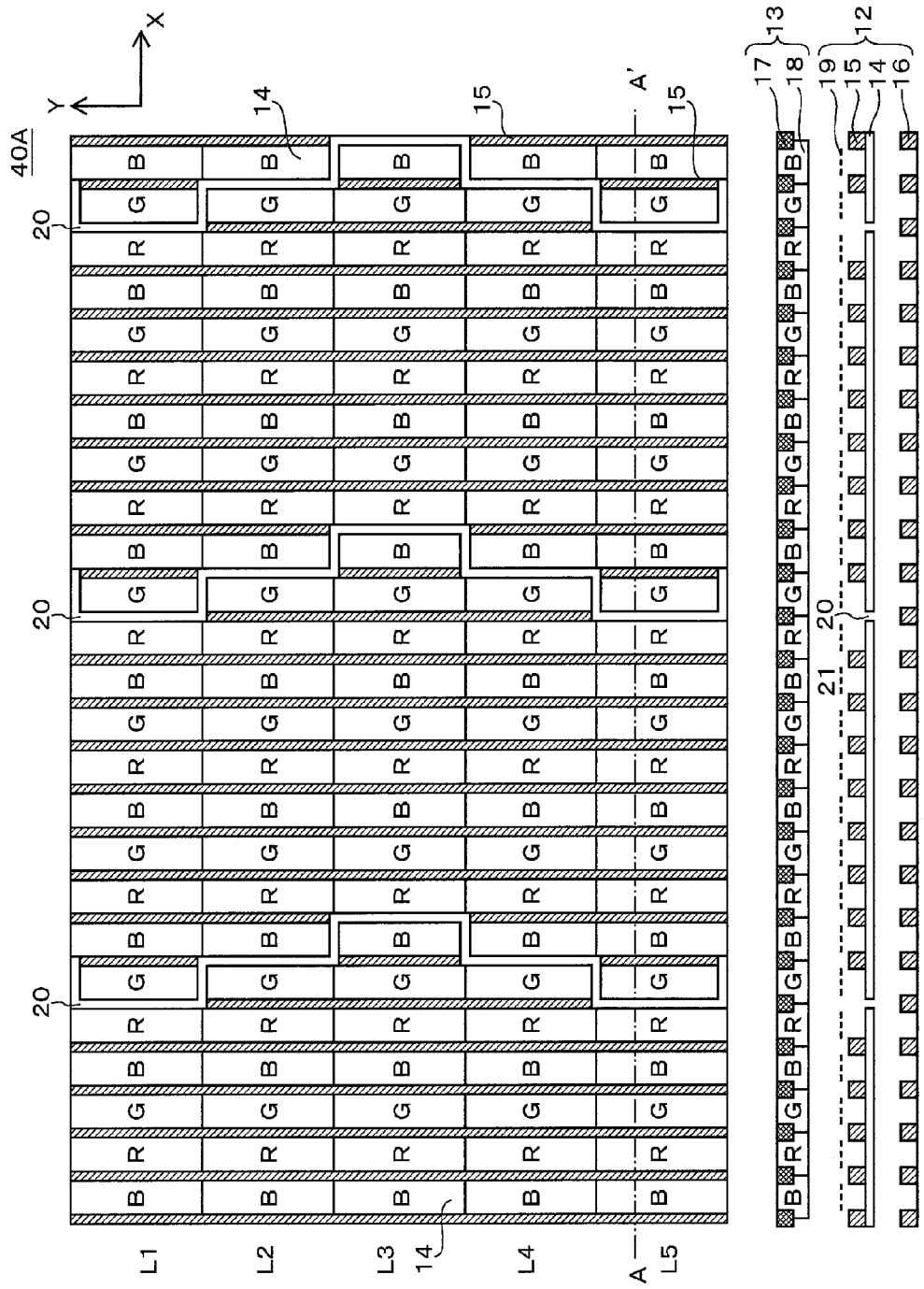

DISPLAY DEVICE

CLAIM OF PRIORITY

The present application claims priority from Japanese patent application JP2013-211293 filed on Oct. 8, 2013, the content of which is hereby incorporated by reference into this application.

BACKGROUND

The present invention relates to a display device, which is applicable to the display device with an in-cell type touch panel, for example.

Recently, the capacitive touch panel has been employed as the input function installed in the liquid crystal display device for mobile usage, mainly of smartphones. Efforts have been made to promote the in-cell type capacitive touch panel by incorporating the function into the liquid crystal display device. The common electrode with FFS (Fringe Field Switching) structure has been utilized for realizing the aforementioned in-cell type capacitive touch panel. The common electrode as ITO (Indium Tin Oxide) is formed on the TFT (Thin Film Transistor) glass substrate, which serves as a driving electrode for the touch panel. The detection electrode as ITO is formed on the back surface of the CF (Color Filter) glass substrate.

In reference to JP-A-2009-244958, the common electrode divided in the gate line direction is combined with the detection electrode divided in the source line direction so as to provide the touch panel function. As JP-A-2010-231773 and WO 2012/073792 disclose, the common electrode is divided in the source line direction.

SUMMARY

The applicant of the present invention has found the problem as described below, which is revealed when dividing the common electrode wiring layer in the source wiring layer direction.

If the common electrode wiring layer is divided in the gate wiring layer direction, the metal wiring layer is disposed above the source wiring layers in entirety at the position below a BM (Black Matrix), which is in contact with the common electrode wiring layer for reducing the resistance thereof. This makes it possible to prevent the color mixture at viewing angle resulting from assembly displacement between the TFT glass substrate and the CF glass substrate. However, if the common electrode wiring layer is divided in the source wiring layer direction, it is not possible to dispose the metal wiring layer at the position where the common electrode wiring layer is divided. This may cause the color mixture at viewing angle.

It is an object of the present invention to provide the display device that lessens the color mixture at viewing angle.

Any other problems and novel features will be clarified by the description of disclosure herein and the drawings.

Summary of the present invention will be described as below.

The display device is configured that the common electrode wiring layer is divided in the source wiring layer direction, and the metal wiring layer is disposed above the source wiring layer at the part in contact with the upper part of the common electrode wiring layer. The metal wiring layer is not disposed at the position where the common electrode wiring layer is divided. The metal wiring layer may be designed to be positioned above the source wiring layer, but not to be disposed at the position between the same colors as those at the divided position of the common electrode wiring layer.

The display device as described above is capable of lessening the color mixture at viewing angle.

BRIEF DESCRIPTION OF THE DRAWINGS

FIG. 3B is an explanatory view with respect to principle that the color mixture at viewing angle occurs upon assembly displacement;

FIG. 3C is an explanatory view with respect to principle that the color mixture at viewing angle occurs upon assembly displacement;

FIG. 3D is an explanatory view with respect to principle that the color mixture at viewing angle occurs upon assembly displacement;

FIGS. 4A and 4B are views illustrating structure of a liquid crystal display device according to a first embodiment;

FIG. 7A is a view illustrating structure of a liquid crystal display device according to a third embodiment;

DESCRIPTION OF THE PREFERRED EMBODIMENTS

The problem of the color mixture at viewing angle, which has been found by the applicant of the present invention will be described.

Figure 1:
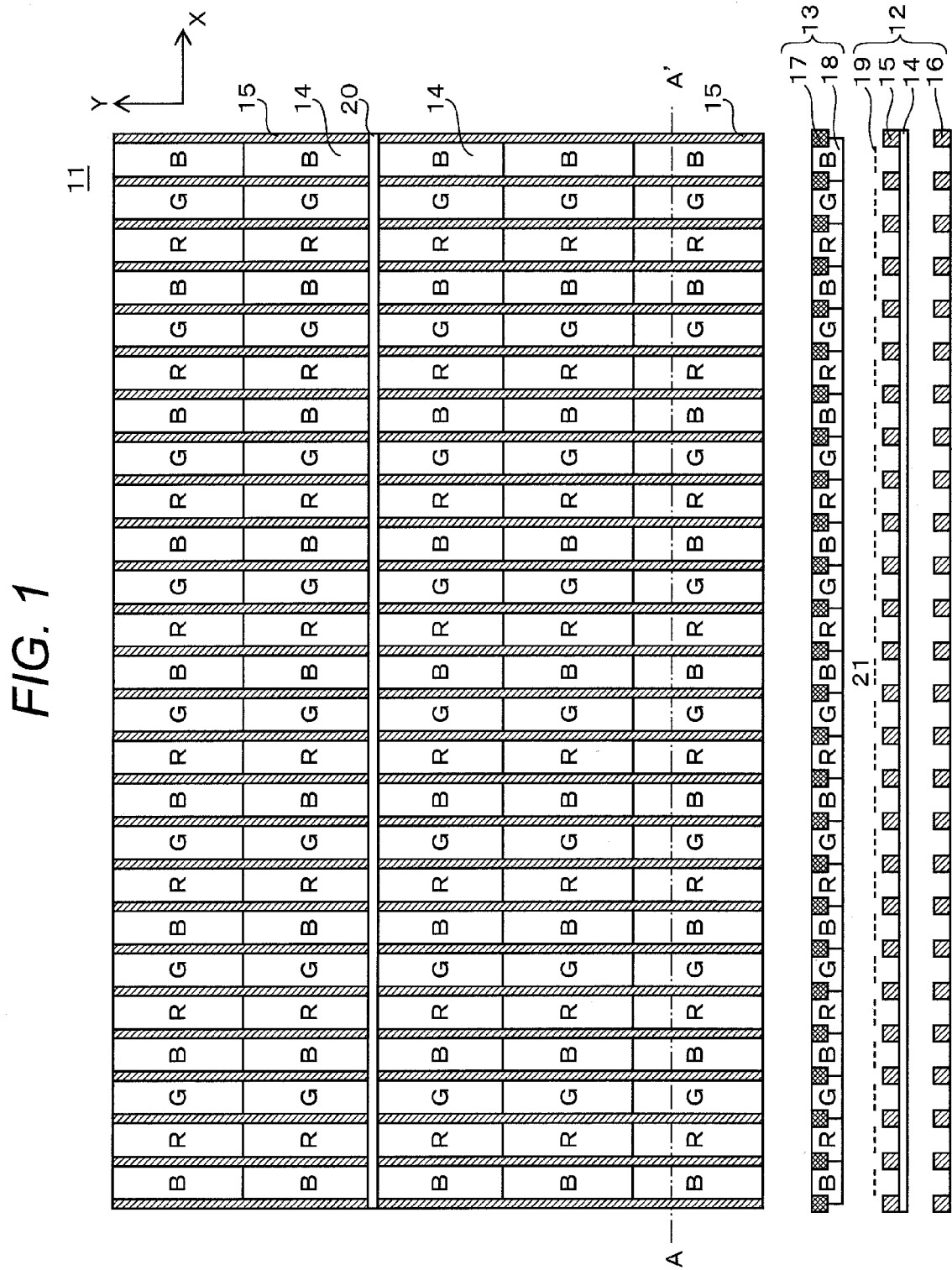
FIG. 1 is a view illustrating structure of a liquid crystal display device according to a first comparative example.

FIG. 1 is a view illustrating structure of the display device according to a first comparative example. The upper section of FIG. 1 is a plan view illustrating a part of the liquid crystal display device, and the lower section is a sectional view taken along line A-A' of the upper section. A display device 11 according to the first comparative example includes a TFT glass substrate 12, a CF glass substrate 13, and a liquid crystal layer 21 interposed between the TFT glass substrate 12 and the CF glass substrate 13. A common electrode wiring layer 14 of the TFT glass substrate 12 is divided in the direction parallel to a gate wiring layer (X direction) so that metal wiring layers 15 in connection with the common electrode wiring layer 14 are disposed between the respective subpixels. A division region 20 (division position) between the divided parts of the common electrode wiring layer 14 extends in the X direction, and is periodically arranged in the Y direction. The metal wiring layer 15 provides both the function as a light shielding layer for preventing the color mixture at viewing angle, which occurs upon assembly displacement between the CF glass substrate 13 and the TFT glass substrate 12 of a high definition panel, and the function of lessening the resistance of the common electrode wiring layer 14. In this case, the division position of the common electrode wiring layer 14 is located above a not shown video line (gate wiring layer). Therefore, the metal wiring layers 15 may be disposed above the signal lines (source wiring layers) 16 in entirety except a part which intersects the gate wiring layer. In other words, the metal wiring layers 15 are formed above the signal wiring layers 16, corresponding to the positions below BMs 17 in entirety.

A CF glass substrate 13 includes color filters (color layer) 18 of red (R), green (G) and blue (B), and the BMs 17. The color filters 18 are repeatedly disposed in the row direction (X direction) in the order of R, G and B. The color filter 18 has the same color sections arranged in the column direction. The color filter has a rectangular shape in planar view, having a length in the X direction shorter than the one in the Y direction.

A not shown detection electrode wiring layer extends in the direction parallel to a source wiring layer 16 (Y direction), and is periodically disposed in the X direction on a back surface of the CF glass substrate 13 (upper surface shown in the lower section of FIG. 1).

Each of the common electrode wiring layer 14 and a pixel electrode wiring layer 19 is made of a translucent metal layer, for example, ITO. Each of the metal wiring layer 15 and the source wiring layer 16 is made of a light shielding metal layer.

Figure 2A:
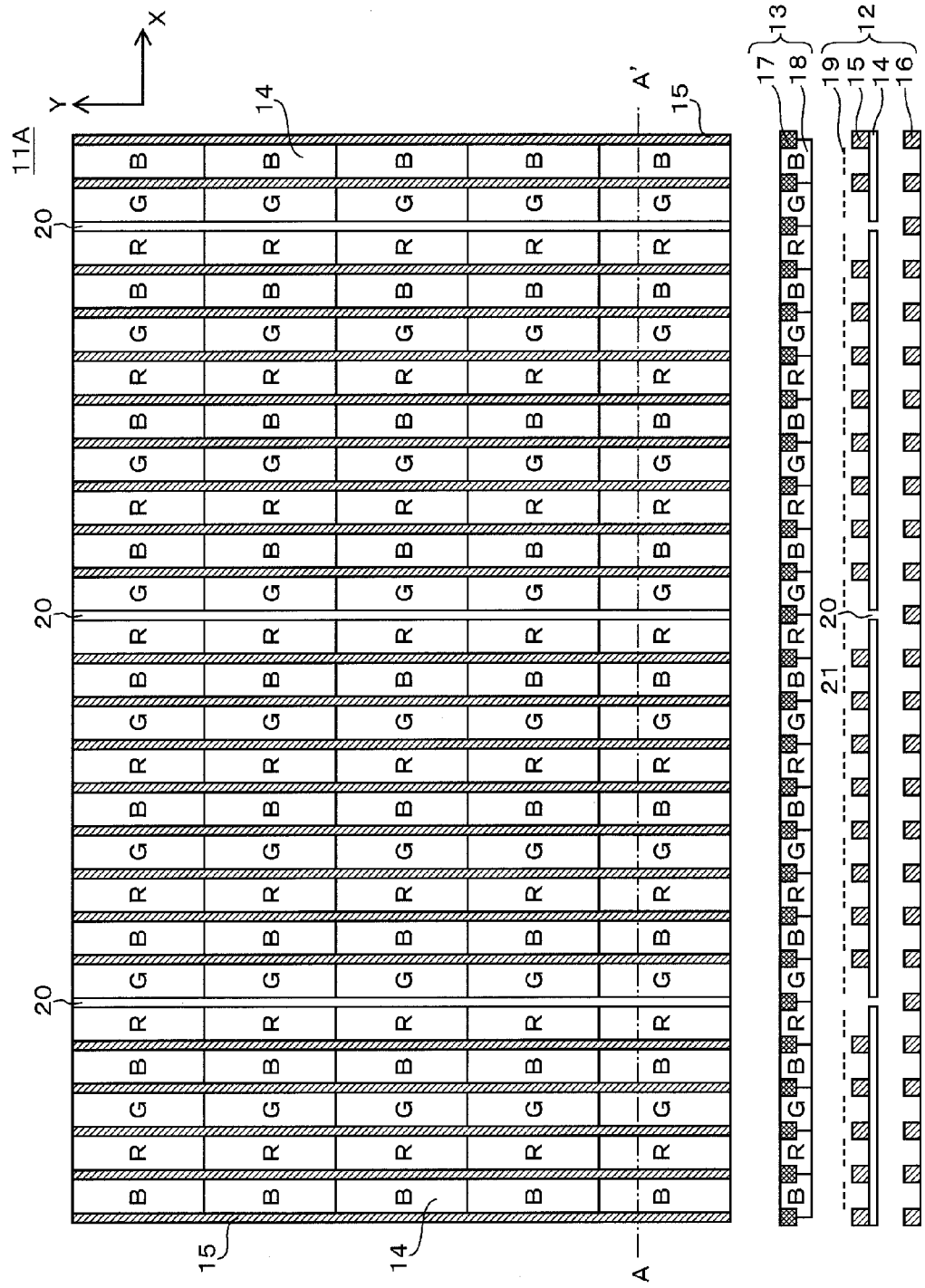
FIG. 2A is a view illustrating structure of a liquid crystal display device according to a second comparative example.
Figure 2B:
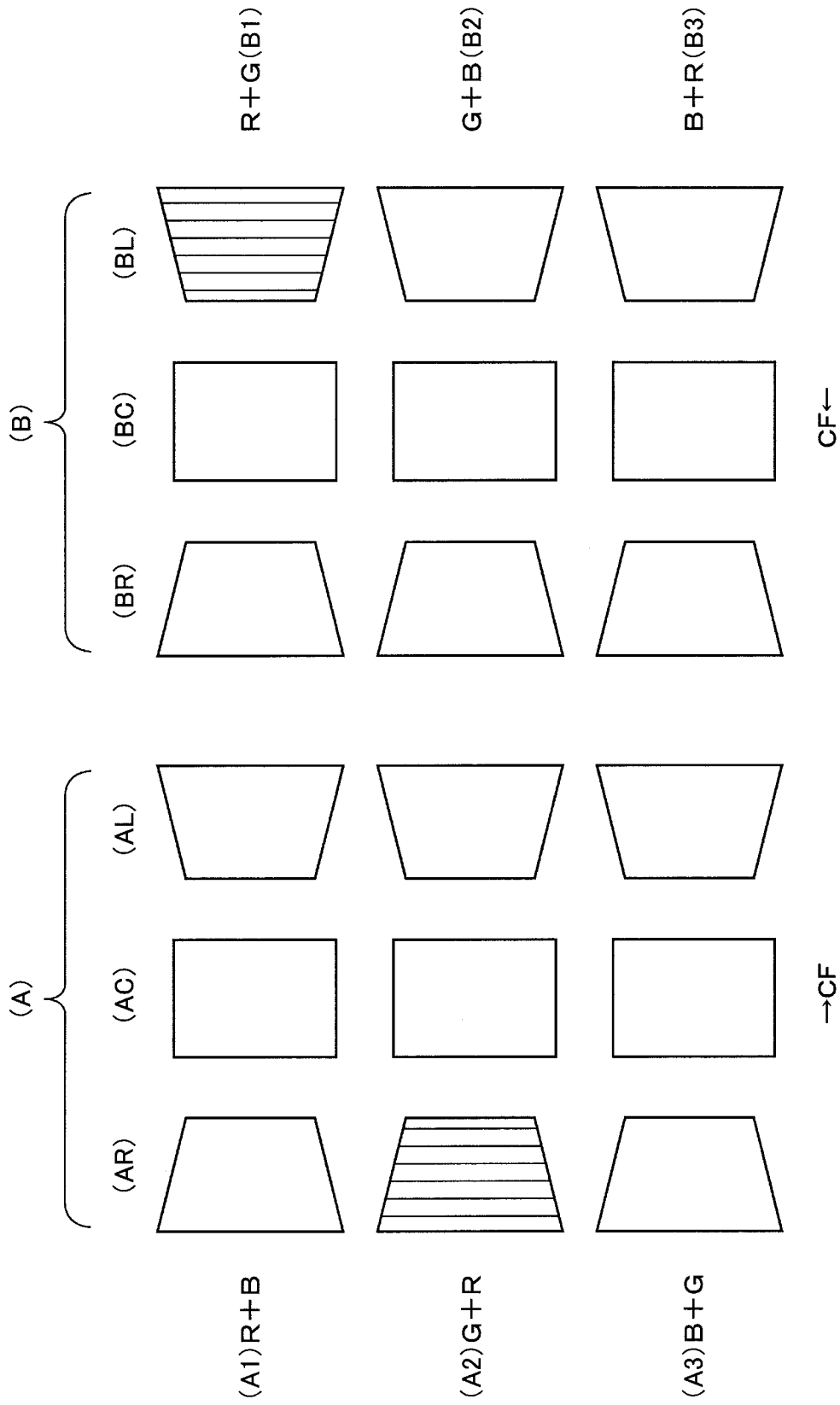
FIG. 2B is a view representing color mixture which occurs on the liquid crystal display device according to the second comparative example.

FIG. 2A is a view showing structure of the display device according to a second comparative example. FIG. 2B represents the color mixture which occurs on the display device according to the second comparative example. The upper section of FIG. 2A is a plan view showing a part of the liquid crystal display device, and the lower section is a sectional view taken along line A-A' of the upper section. Referring to a display device 11A according to the second comparative example, the common electrode wiring layer 14 of the TFT glass substrate 12 extends in the direction parallel to the source wiring layer 16 (Y direction), and divided in the X direction so as to be periodically arranged. The metal wiring layers 15 are disposed in connection with the common electrode wiring layer 14 between the respective subpixels. In order to prevent short-circuit between the divided parts of the common electrode wiring layer 14, the metal wiring layer 15 is not disposed at the division position (division region) of the common electrode wiring layer 14. In other words, the metal wiring layer 15 is not disposed above the source wiring layer 16 located at the division position of the common electrode wiring layer 14, which is located below the BM 17. As a result, color mixture at viewing angle may occur upon the assembly displacement (hereinafter simply referred to as "assembly displacement") between the CF glass substrate 13 and the TFT glass substrate 12. The division region (division position) 20 between the divided parts of the common electrode wiring layers 14 extends in the Y direction, and periodically disposed in the X direction. The division position 20 of the common electrode wiring layer 14 is interposed between the red subpixel and the green subpixel. The single divided part of the common electrode wiring layer 14 includes 9 subpixels (3 pixels) arranged in the X direction. The distance (width of the division region) between the divided parts of the common electrode wiring layer 14 is smaller than the width of the metal wiring layer 15. The width of the metal wiring layer 15 is smaller than that of the BM 17. The common electrode wiring layer 14 is not divided in the Y direction, which is used for all the pixels arranged in the Y direction.

Figure 3A:
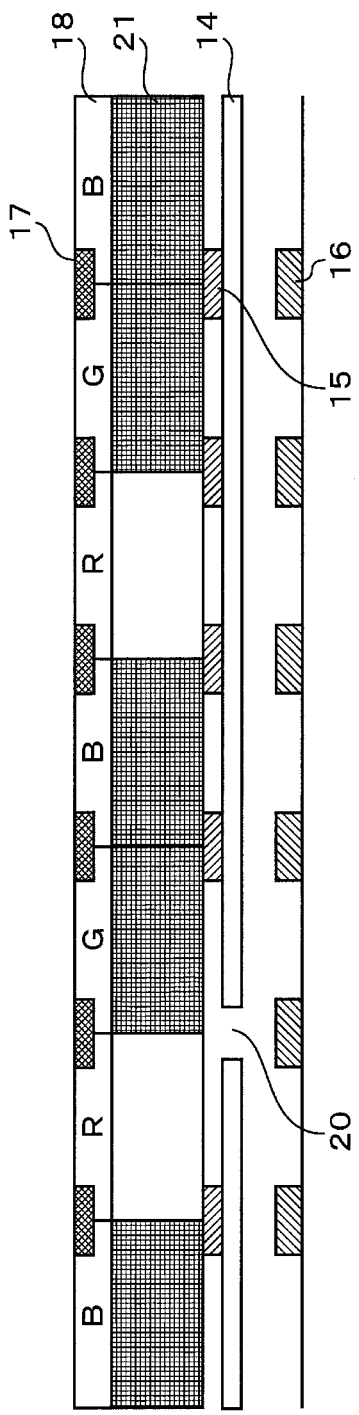
FIG. 3A is an explanatory view with respect to principle that the color mixture at viewing angle occurs upon assembly displacement.

FIGS. 3A to 3D are explanatory views with respect to the principle that color mixture at viewing angle occurs upon assembly displacement. FIG. 3A is a sectional view representing the state with no assembly displacement upon application of a white voltage only to the red subpixels. FIG. 3B is a sectional view representing the state where the assembly displacement occurs upon application of the white voltage only to the red subpixels. The upper section of FIG. 3B is a sectional view representing the state where the CF glass substrate displaces to the right. The lower section of FIG. 3B is a sectional view representing the state where the CF glass substrate displaces to the left. FIG. 3C is a sectional view representing the state where the assembly displacement occurs upon application of the white voltage only to the green subpixels. The upper section of FIG. 3C is a sectional view representing the state where the CF glass substrate displaces to the right. The lower section of FIG. 3C is a sectional view representing the state where the CF glass substrate displaces to the left. FIG. 3D is a sectional view representing the state where the assembly displacement occurs upon application of the white voltage only to the blue subpixels. The upper section of FIG. 3D is a sectional view representing the state where the CF glass substrate displaces to the right. The lower section of FIG. 3D is a sectional view representing the state where the CF glass substrate displaces to the left.

Referring to FIG. 3A, the white voltage is applied only to the red subpixels, and no assembly displacement occurs. The boundary between the white voltage and the black voltage exists at the position corresponding to the center of the BM 17, which causes no color mixture at viewing point.

Referring to the upper section of FIG. 3B, the white voltage is applied only to the red subpixels. As the metal wiring layer 15 is disposed at the position where the white voltage is near the adjacent blue color filter, if the white voltage is applied only to the red subpixels, and the CF glass substrate 13 displaces to the right, no light leakage occurs, neither the color mixture does. The condition represented by the upper section of FIG. 3B will be designated as "R+B" (which applies to FIG. 2B). Referring to the lower section of FIG. 3B, the white voltage is applied only to the red subpixels, and the CF glass substrate 13 displaces to the left. The metal wiring layer 15 is not disposed at the point where the white voltage is near the adjacent green color filter. In this case, the light transmitting through the liquid crystal on the TFT glass substrate 12, corresponding to the red subpixel transmits through the red and green color filters. This may cause the green to be mixed with the red. Meanwhile, no color mixture occurs at the point where the metal wiring layer 15 is disposed at the boundary between the red and the green subpixels. The condition represented by the lower section of FIG. 3B will be designated as "R+G" (which applies to FIG. 2B).

Referring to the upper section of FIG. 3C, the white voltage is applied only to the green subpixels, and the CF glass substrate 13 displaces to the right. The metal wiring layer 15 is not disposed at the point where the white voltage is near the adjacent red color filter. In this case, the light transmitting through the liquid crystal on the TFT glass substrate 12, corresponding to the green subpixel transmits through the green and the red color filters, resulting in the color mixture of red with green. Meanwhile, the color mixture does not occur at the point where the metal wiring layer 15 exists at the boundary between the green and the red subpixels. The condition represented by the upper section of FIG. 3C will be designated as "G+R" (which applies to FIG. 2B). Referring to the lower section of FIG. 3C, the white voltage is applied only to the green subpixels, and the CF glass substrate 13 displaces to the left, the metal wiring layer 15 is disposed at the point where the white voltage is near the adjacent blue color filter. Therefore, no light leakage occurs, neither the color mixture does. The condition represented by the lower section of FIG. 3C will be designated as "G+B" (which applies to FIG. 2B).

Referring to the upper section of FIG. 3D, the white voltage is applied only to the blue subpixels, and the CF glass substrate 13 displaces to the right. The metal wiring layer 15 is disposed at the point where the white voltage is near the adjacent green color filter. Therefore, no light leakage occurs, neither the color mixture does. The condition represented by the upper section of FIG. 3D will be designated as "B+G" (which applies to FIG. 2B). Referring to the lower section of FIG. 3D, the white voltage is applied only to the blue subpixels, and the CF glass substrate 13 displaces to the left. The metal wiring layer 15 is disposed at the point where the white voltage is near the adjacent red color filter. Accordingly, no light leakage occurs, neither the color mixture does. The condition represented by the lower section of FIG. 3D will be designated as "B+R" (which applies to FIG. 2B).

If the division position of the common electrode wiring layer 14 is located at the point between the red subpixel and the green subpixel, the color mixture at viewing angle occurs as described above. If the division position of the common electrode wiring layer 14 is located at the point between the green subpixel and the blue subpixel, the color mixture of blue with the green, or green with the blue occurs. If the division position of the common electrode wiring layer 14 is located at the point between the blue subpixel and the red subpixel, the color mixture of the red with the blue or the blue with the red occurs. If light leakage occurs at the subpixel with high transmittance, the color mixture becomes worsened. It is therefore preferable to avoid division of the common electrode wiring layer at the side of the subpixel with the highest transmittance. Among the subpixels, the transmittance is high in the order of white subpixel>green subpixel>red subpixel>blue subpixel. In other words, the white subpixel has the highest transmittance, and the blue subpixel has the lowest transmittance.

Referring to FIG. 2B, the section A represents the state where the CF glass substrate displaces to the right, and the section B represents the state where the CF glass substrate displaces to the left. Referring to FIG. 2B, states AR and BR represent the liquid crystal display device seen from the right side, and states AC and BC represent the liquid crystal display device seen from the front. States Al and BL represent the liquid crystal display device seen from the left side. Referring to FIG. 2B, states A1 and B1 represent the display device resulting from assembly displacement upon application of the white voltage only to the red subpixels, states A2 and B2 represent the display device resulting from assembly displacement which occurs upon application of the white voltage only to the green subpixels, and states A3 and B3 represent the display device resulting from assembly displacement which occurs upon application of the white voltage only to the blue subpixels. The division position of the common electrode wiring layer 14, that is, the point at which the metal wiring layer 15 is not disposed is periodically arranged. In the state defined by A2 and AR shown in FIG. 2B, red vertical stripes may appear in the condition G+R. In the state defined by B1 and BL, the green vertical stripes may appear on the red screen in the condition R+G.

Embodiments and modified examples will be described referring to the drawings. In the following description, the same elements are designated with the same codes, and explanations thereof, thus will be omitted.

FIGS. 4A and 4B illustrate structure of a liquid crystal display device according to a first embodiment. FIG. 4A is a plan view of the respective substrates of the liquid crystal display device, and FIG. 4B is a side view. A liquid crystal display device 40 according to the first embodiment includes an in-cell type touch panel function, which allows the common electrode wiring layer to function as the drive electrode wiring layer of the touch panel.

The liquid crystal display device 40 includes the TFT glass substrate 12, the CF glass substrate 13, the liquid crystal layer 21, a backlight 41, a polarizing plate 42, a controller 43, a touch IC 45, and cables 49a, 49b, 49c. The liquid crystal display device 40 has a vertically long structure (the length in the Y direction is longer than that in the X direction). The TFT glass substrate 12 includes an LCD scan circuit 46, a common electrode selector (COM selector) 47, and a signal line selector 48 in the form of TFT. A driver 44 formed as a semiconductor integrated circuit (IC) such as CMOS is installed in the TFT glass substrate 12 through COG mounting. The driver 44 is connected to the controller 43 formed as the IC via the cable 49a. A plurality of detection electrode wiring layers 50 extending in the X direction are formed on the upper surface (opposite the liquid crystal layer 21) of the CF glass substrate 13. The detection electrode wiring layers 50 are connected to the touch IC 45 via the cable 49b, which is mounted thereon. The cable 49b is connected to the controller 43. The backlight 41 is connected to the controller 43 via the cable 49c. The polarizing plates 42 are disposed on the upper surface of the CF glass substrate 13, and between the backlight 41 and the TFT glass substrate 12, respectively.

Figure 5A:
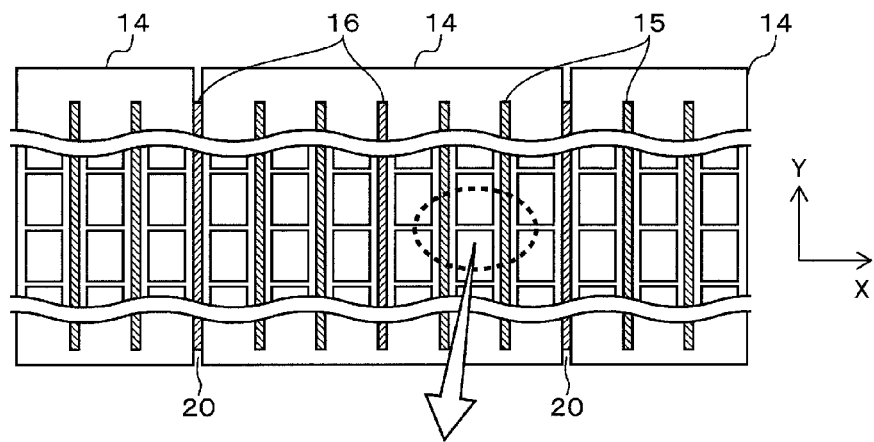
FIGS. 5A to 5C are views illustrating structure of the TFT glass substrate according to the first embodiment.
Figure 5B:
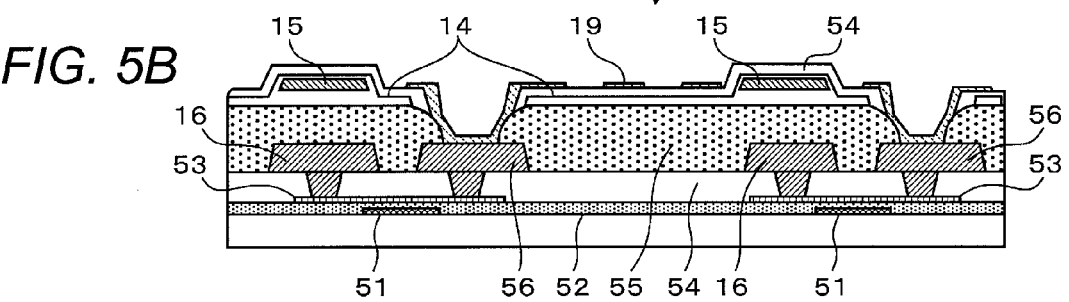
Figure 5C:
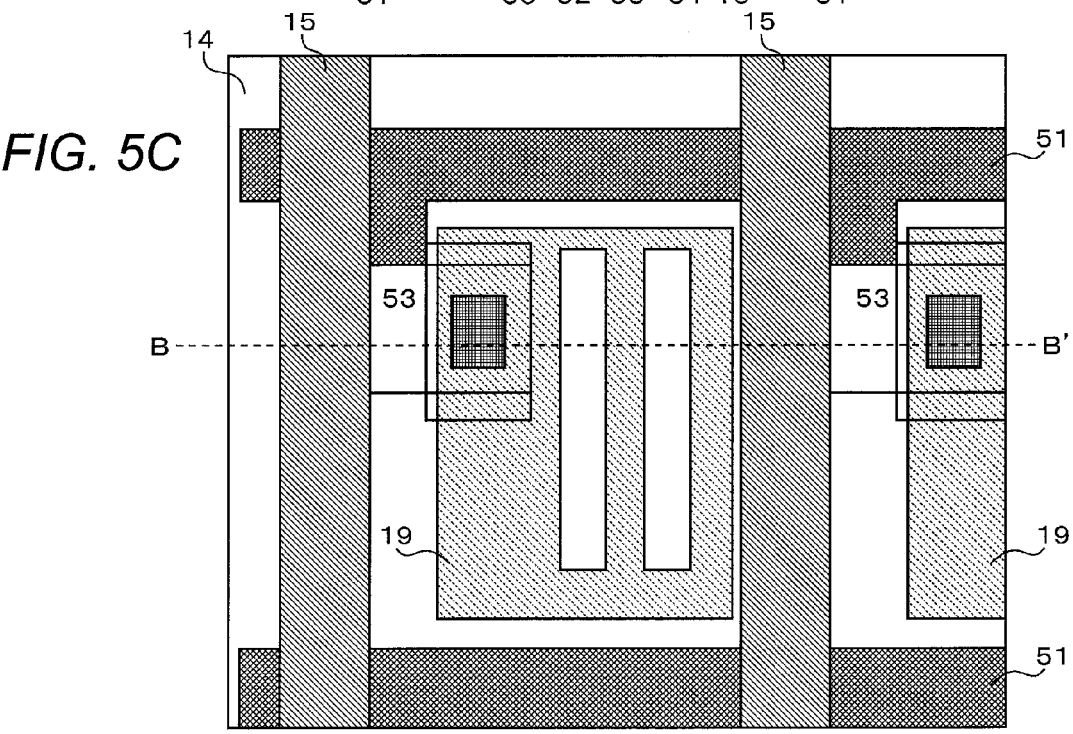

FIGS. 5A to 5C are views showing structure of the TFT glass substrate according to the first embodiment. FIG. 5A is a plan view illustrating a part of the TFT glass substrate, and FIG. 5C is a plan view showing a partially enlarged part of a region enclosed with a broken line shown in FIG. 5A. FIG. 5B is a sectional view taken along line B-B' of FIG. 5C.

Figure 6A:
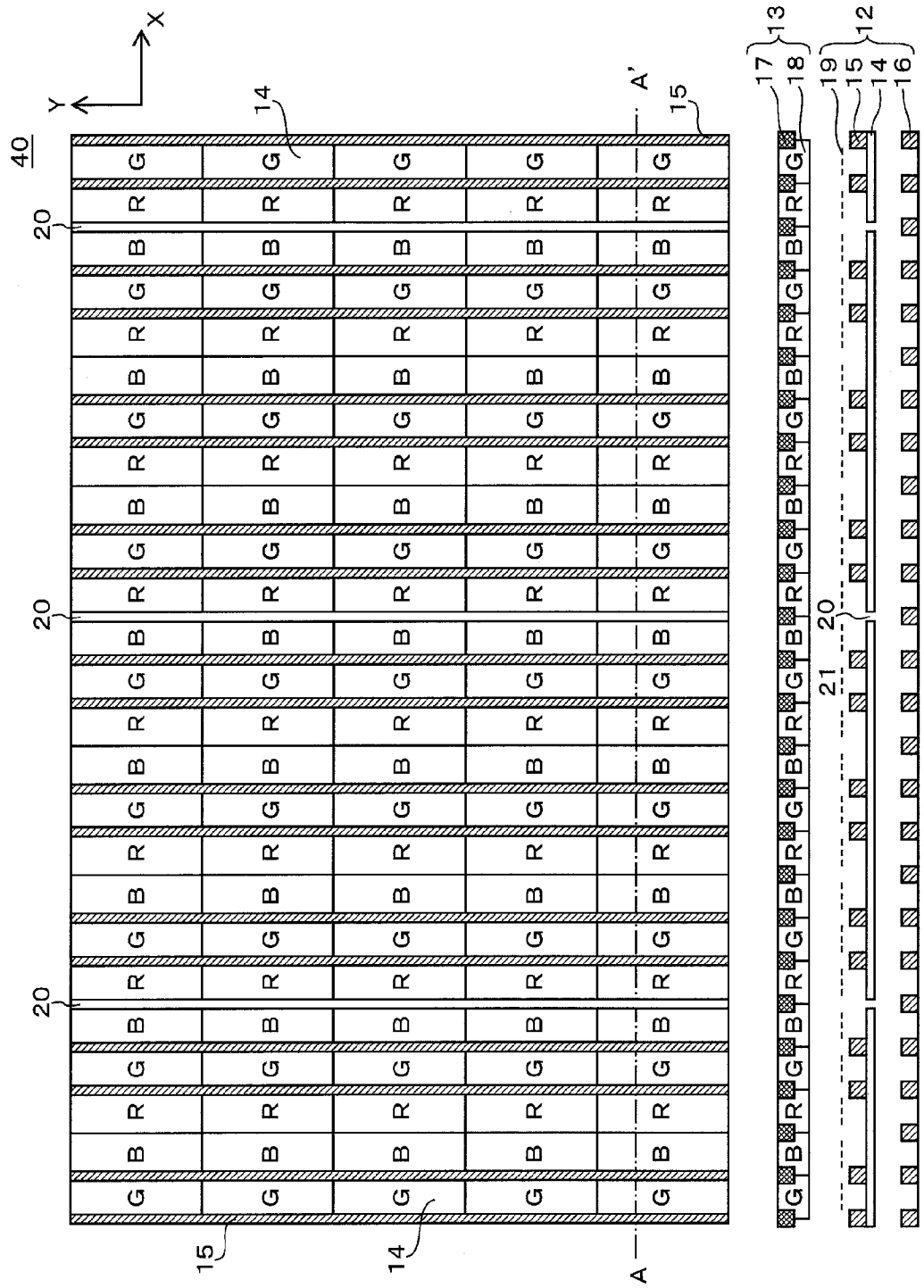
FIG. 6A is a view illustrating structure of the liquid crystal display device according to the first embodiment.

The common electrode wiring layer 14 extends parallel to the signal wiring layer 16 (in the Y direction), and is divided in the X direction so as to be periodically arranged. The metal wiring layer 15 is disposed between the respective subpixels, which is in connection with the common electrode wiring layer 14. In order to prevent short-circuit between the divided parts of the common electrode wiring layer 14, the metal wiring layer 15 is not disposed at the division position (in the division region) of the common electrode wiring layer 14. In other words, the metal wiring layer 15 is not disposed above the signal wiring layer 16 located at the division position of the common electrode wiring layer 14, corresponding to the position below the BM 17. The division region (division position) 20 between the divided parts of the common electrode wiring layer 14 extends in the Y direction, and periodically arranged in the X direction. The metal wiring layer 15 is not disposed between the same colors as those at the division position of the divided parts of the common electrode wiring layer 14. Except contact holes for connecting the pixel electrode layer 19 and a drain electrode layer 56, the divided parts of the common electrode layer 14 are connected between the subpixels. For convenience of graphic representation, the single divided part of the common electrode wiring layer 14 in the X direction contains 6 subpixels (2 pixels). In this embodiment, likewise the second comparative example as shown in FIG. 6A, the single divided part of the common electrode wiring layer 14 in the X direction contains 9 subpixels (3 pixels). The distance between the divided parts of the common electrode wiring layer 14 (width of the division region) is smaller than that of the metal wiring layer 15. The metal wiring layer 15 has the width smaller than that of the BM 17.

A gate wiring layer 51 is formed on a glass substrate 58, on which a semiconductor layer 53 is formed via a gate insulating film 52. The source wiring layer 16 and the drain electrode layer 56 are connected to the semiconductor layer 53 via the contact hole of an inter-layer insulating layer 54. The common electrode wiring layer 14 is disposed above the source wiring layer 16 via an insulating film layer 55. The metal wiring layer 15 is disposed on the common electrode wiring layer 14 in contact therewith at the position above the source wiring layer 16. The pixel electrode layer 19 is formed on the common electrode wiring layer 14 via an inter-layer insulating film layer 57. The pixel electrode layer 19 is connected to the drain electrode layer 56 via the contact hole of the insulating film layer 55. The pixel electrode layer 19 has a slit. The gate wiring layer 51 extends in the X direction, and also extends in the Y direction towards the semiconductor layer 53. The common electrode wiring layer 14 and the pixel electrode layer 19 are made of the translucent metal layer such as ITO. Meanwhile, the metal wiring layer 15 and the source wiring layer 16 are made of the light shielding metal layer.

Figure 6B:
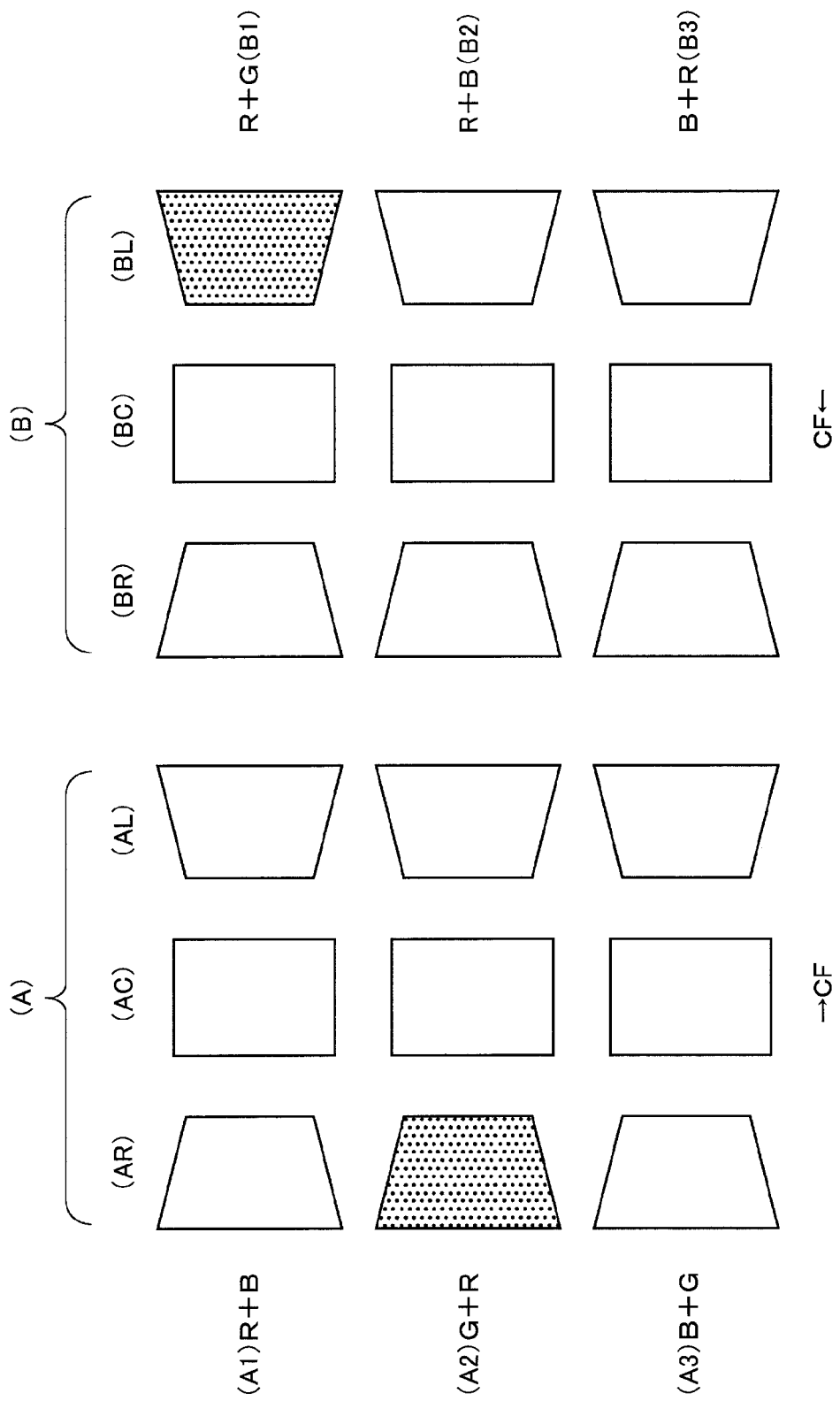
FIG. 6B is a view representing color mixture on a liquid crystal display device according to a third comparative example.

FIG. 6A is a view illustrating structure of the liquid crystal display device according to the first embodiment. FIG. 6B represents the color mixture on the liquid crystal display device according to a third comparative example. The upper section of FIG. 6A is a plan view illustrating a part of the liquid crystal display device, and the lower section is a sectional view taken along line A-A' of the upper section. The display device 40 according to the first embodiment has the similar structure to that of the display device 11A according to the second comparative example. The metal wiring layers 15 are not disposed at positions between the subpixels of the same color as those at the division position of the common electrode wiring layer 14. The display device 11A according to the second comparative example is configured that the common electrode wiring layer 14 is divided at the position between the red and the green subpixels. Meanwhile, the display device 40 according to the first embodiment is configured that the common electrode wiring layer 14 is divided between the red and the blue subpixels. Referring to FIG. 6A, the common electrode wiring layer 14 is divided between the red and the blue subpixels at which the metal wiring layers 15 is not disposed at all. Likewise the second comparative example, the liquid crystal display device according to the third comparative example is configured that the common electrode wiring layer 14 is divided between the red and the green subpixels at which the metal wiring layer 15 is not disposed at all.

The color mixture that occurs in the liquid crystal display device according to the third comparative example will be described. Referring to FIG. 6B, the section A represents the state where the CF glass substrate displaces to the right, and the section B represents the state where the CF glass substrate displaces to the left. Referring to FIG. 6B, the states AR and BR represent the liquid crystal display device seen from the right side, the states AC and BC represent the liquid crystal display device seen from the front, and states AL and BL represent the liquid crystal display device seen from the left side. Referring to FIG. 6B, states A1 and B1 represent the display device resulting from assembly displacement which occurs upon application of the white voltage only to the red subpixels, states A2 and B2 represent the display device resulting from assembly displacement which occurs upon application of the white voltage only to the green subpixels, and states A3 and B3 represent the display device resulting from the assembly displacement which occurs upon application of the white voltage only to the blue subpixels. The division positions of the common electrode wiring layer 14, that is, the parts with no metal wiring layers 15 are arranged periodically at shorter cycle than the second comparative example. In the state defined by A2 and AR in the condition G+R shown in FIG. 6B, the red is uniformly mixed with the green screen to a small extent. In the state defined by B1 and BL in the condition R+G, the green is uniformly mixed with the red screen to a small extent.

The color mixture on the display device according to the first embodiment will be described. As the metal wiring layers 15 are eliminated from all the regions between the red and the blue subpixels in the display device 40, in the state defined by B3 and BL in the condition B+R shown in FIG. 6B, the red is uniformly mixed with the blue screen to a small extent. In the state defined by A1 and AR in the condition R+B, the blue is uniformly mixed with the red screen to a small extent. The metal wiring layers 15 are retained at the side of the green subpixel with the highest transmittance. Therefore, compared to the third comparative example (shown in FIG. 6B), this case ensures to prevent the color mixture with higher possibility.

It has been clarified that the above-structured embodiment fails to provide the effect for preventing the color mixture at viewing angle at the point between the red and the blue subpixels, but provides such effect at the points between the red and the blue, and between the green and the red.

The common electrode wiring layer 14 functioning as the drive electrode wiring layer of the touch panel extends in the Y direction, and divided in the X direction so as to be periodically arranged. A plurality of detection electrode wiring layers 50 extend in the X direction, and arranged in the Y direction. The width of the common electrode wiring layer 14 is larger than that of the detection electrode wiring layer 50. The detection electrode wiring layer can be increased more easily than the common electrode wiring layer. It is therefore possible for the vertically long display device to improve the touch detection accuracy easily by increasing the number of the detection electrode wiring layers.

Second Embodiment

The liquid crystal display device according to the second embodiment has the same structure as that of the liquid crystal display device 11A according to the second comparative example shown in FIG. 2A. That is, it is configured not to dispose the metal wiring layers 15 only at the division position, and to arrange them at the point between the subpixels. If the definition of the subpixel is sufficient, the width of the region where color mixture at viewing angle occurs between the subpixels only in plane may be sufficiently small so that the color mixture cannot be visually recognized by the observer. Therefore, this makes it possible to provide the effect for preventing the color mixture between the red and the green subpixels. Division of the common electrode wiring layer 14 at the point between the red and the blue subpixels may further provide the effect of preventing the color mixture.

Third Embodiment

Figure 7B:
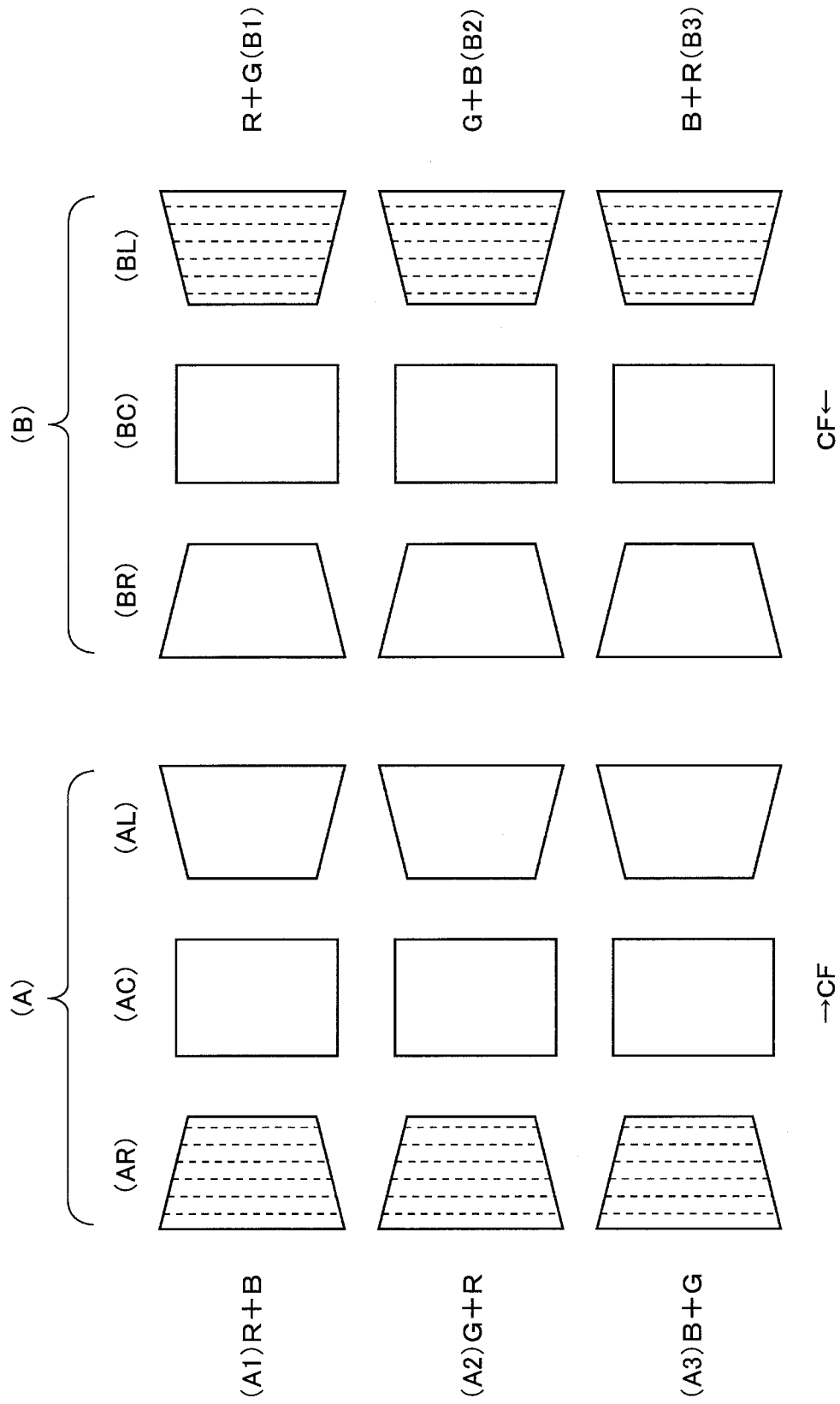
FIG. 7B is a view representing color mixture on the liquid crystal display device according to the third embodiment.

FIG. 7A is a view illustrating structure of the liquid crystal display device according to a third embodiment. FIG. 7B represents the color mixture on the liquid crystal display device according to the third embodiment. The upper section of FIG. 7A is a plan view showing a part of the liquid crystal display device, and the lower section of FIG. 7A is a sectional view taken along line A-A' of the upper section. A liquid crystal display device 40A according to the third embodiment is configured to have the division positions of the common electrode wiring layer 14 formed into a zigzag shape.

The common electrode wiring layer 14 is divided in the direction of the source wiring layer 16 (Y direction) so that it is divided at the point between the red and the green subpixels on the first line L1, it is divided at the point between the green and the blue subpixels on the second line L2, it is divided at the point between the blue and the red subpixels on the third line L3, it is divided at the point between the green and the blue subpixels on the fourth line L4, and it is divided at the point between the red and the green subpixels on the fifth line L5. The common electrode wiring layer 14 is divided in the direction of the gate wiring layer (X direction) so as to be located at the points between the green subpixel on the first line L1 and the green subpixel on the second line L2, the blue subpixel on the second line L2 and the blue subpixel on the third line L3, the blue subpixel on the third line L3 and the blue subpixel on the fourth line L4, and the green subpixel on the fourth line L4 and the green subpixel on the fifth line L5, respectively. The division region 20 is formed to have the zigzag shape having the width corresponding to 2 subpixels in the X direction microscopically, and extends along the Y direction macroscopically.

Referring to FIG. 7A, the division regions of the common electrode wiring layer 14 in the direction of the gate wiring layer (X direction) are located at the upper part of the green subpixel on the first line L1 and at the lower part of the green subpixel on the fifth line L5, respectively. The division region 20 of the common electrode wiring layer 14 may be located at the upper part of the red subpixels on the first line L1, and at the lower part of the red subpixel on the fifth line L5 in the gate wiring layer direction (X direction). In such a case, the division region 20 is formed to have the zigzag shape having the width corresponding to 4 subpixels in the X direction microscopically, and extends along the Y direction macroscopically.

Referring to FIG. 7B, the section A represents the state where the CF glass substrate displaces to the right, and the section B represents the state where the CF glass substrate displaces to the left. Referring to FIG. 7B, the states AR and BR represent the liquid crystal display device seen from the right side, the states AC and BC represent the liquid crystal display device seen from the front, and the states AL and BL represent the liquid crystal display device seen from the left. Referring to FIG. 7B, the states A1 and B1 represent the display device resulting from assembly displacement upon application of the white voltage only to the red subpixels, the states A2 and B2 represent the display device resulting from assembly displacement upon application of the white voltage only to the green subpixels, and the states A3 and B3 represent the display device resulting from assembly displacement upon application of the white voltage only to the blue subpixels. If the definition of the structure shown in the second embodiment is insufficient (second comparative example), there may be the cases where the part of the color mixture at viewing angle appears to be linearly shaped. In such a case, the division positions are formed to have the zigzag shape likewise this embodiment. Then the blue vertical stripes appear on the red screen in the condition R+B in the state defined by the A1 and AR. In the state defined by A2 and AR, the red vertical stripes appear on the green screen in the condition G+R. In the state defined by A3 and AR, the green vertical stripes appear on the blue screen in the condition B+G. Referring to FIG. 7B, in the state defined by B1 and BL, the green vertical stripes appear on the red screen in the condition R+G, and in the state defined by B2 and BL, the blue vertical stripes appear on the green screen in the condition G+B. In the state defined by B3 and BL, the red vertical stripes appear on the blue screen in the condition B+R. The division positions are formed to have the zigzag shape like the embodiment to enable the amount of light leakage upon the color mixture at viewing angle to be reduced to ⅓ of the one in the second comparative example. Accordingly, visibility of the part of the color mixture at viewing angle may be made lower than that of the second comparative example.

Modified Example

Figure 8:
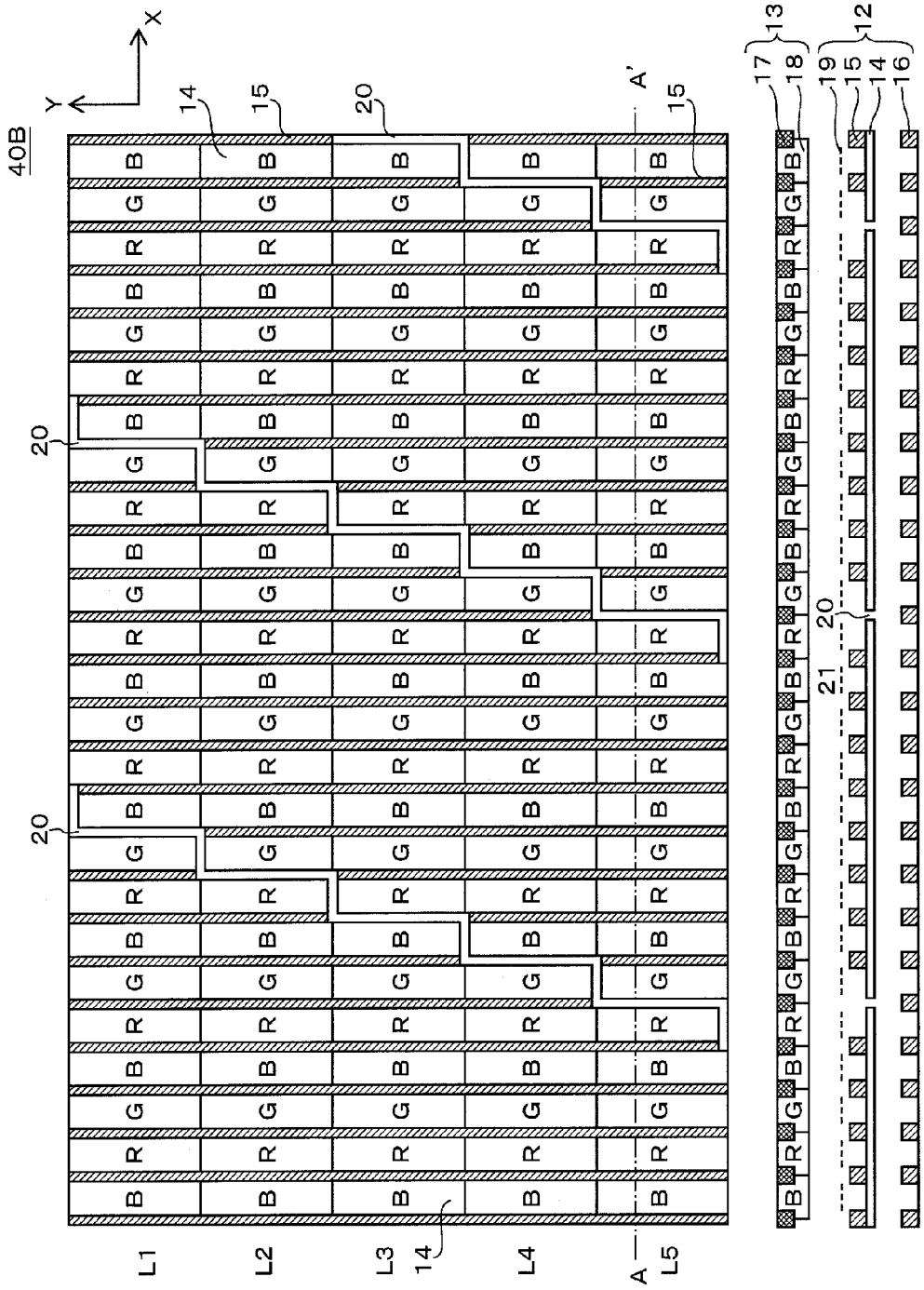
FIG. 8 is a view illustrating structure of a liquid crystal display device according to a first modified example.

FIG. 8 is a view illustrating structure of the liquid crystal display device according to a modified example. The upper section of FIG. 8 is a plan view showing a part of the liquid crystal display device, and the lower section is a sectional view taken along line A-A' of the upper section. A liquid crystal display device 40B according to the modified example forms the zigzag shape repeatedly arranged in one direction so that the diagonally divided common electrodes are arranged. The aforementioned configuration may be made for the purpose of lessening visibility of the color mixture at viewing angle.

The division position of the common electrode wiring layer 14 of the liquid crystal display device 40B is the same as that of the common electrode wiring layer 14 according to the third embodiment from the first line L1 to the third line L3. The division position of the common electrode wiring layer 14 of the liquid crystal display device 40B in the Y direction is located between the red and the green subpixels on the fourth line L4, and between the green and the blue subpixels on the fifth line L5, for example. The division position of the common electrode wiring layer 14 in the X direction is located between the red subpixel on the third line L3 and the red subpixel on the fourth line L4, and between the green subpixel on the fourth line L4 and the green subpixel on the fifth line L5. The division regions 20 are arranged to form the zigzag shape microscopically, and extends along the Y direction macroscopically.

Fourth Embodiment

Figure 9A:
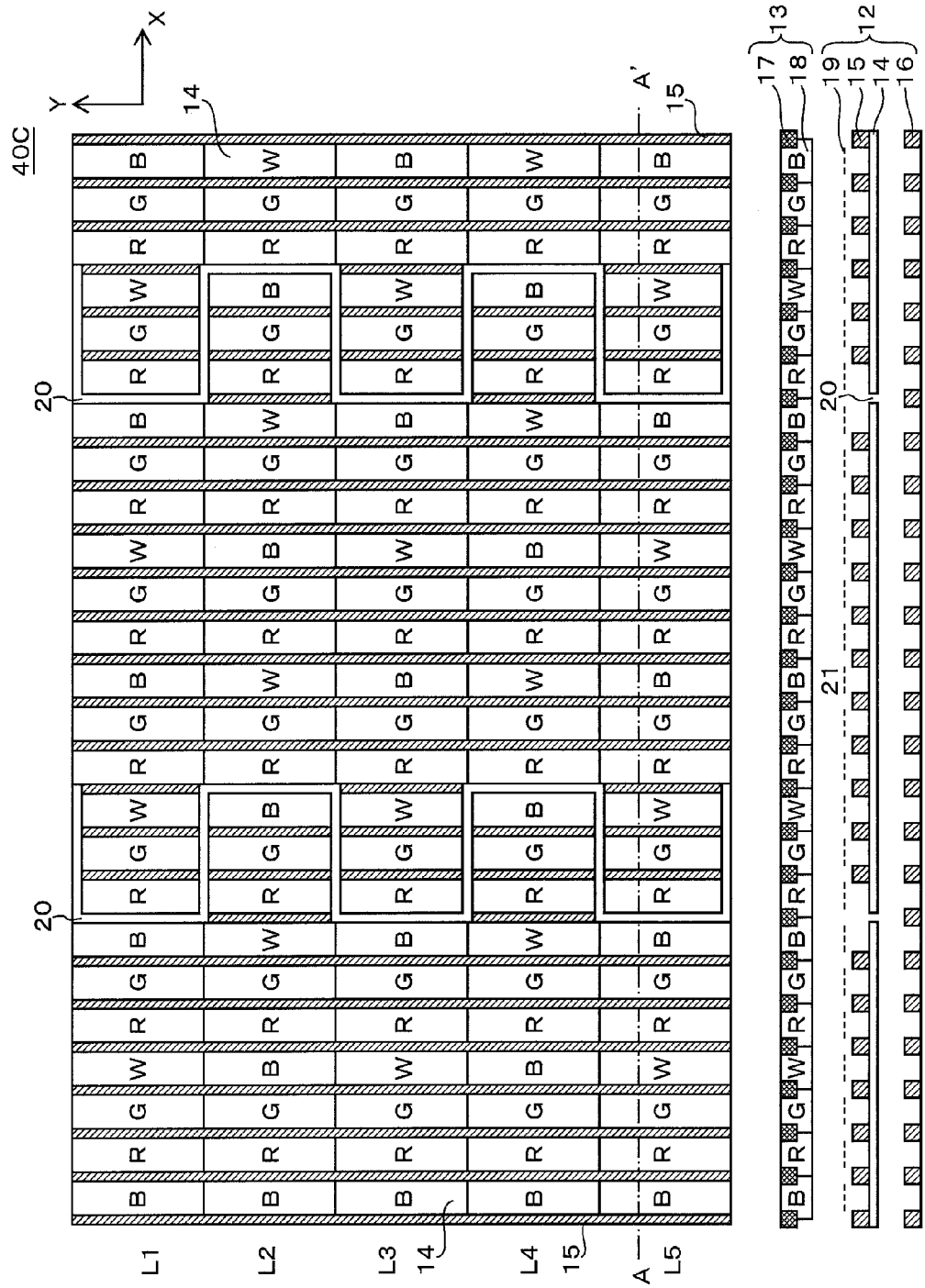
FIG. 9A is a view illustrating structure of a liquid crystal display device according to a fourth embodiment.
Figure 9B:
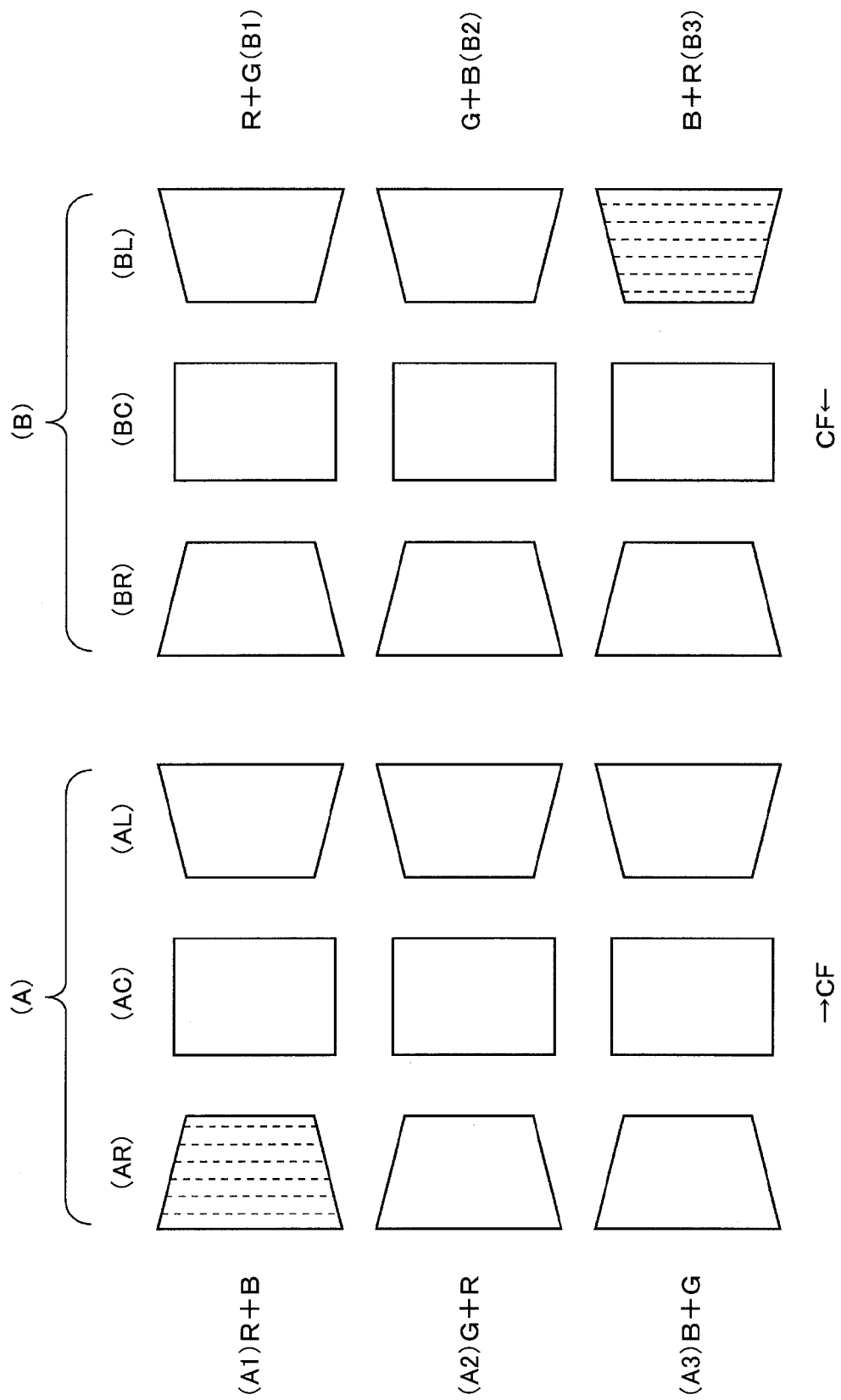
FIG. 9B is a view representing color mixture on the liquid crystal display device according to the fourth embodiment.

FIG. 9A is a view illustrating structure of the liquid crystal display device according to a fourth embodiment. FIG. 9B is a view representing the color mixture on the liquid crystal display device according to the fourth embodiment. Referring to FIG. 9A, the upper section is a plan view showing a part of the liquid crystal display device and the lower section is a sectional view taken along line A-A' of the upper section. A display device 40C according to the fourth embodiment is configured to replace half the blue subpixels with white subpixels in addition to the three-color subpixels of RGB. The display device 40C according to the fourth embodiment is configured to have four-color subpixels of RGBW, which allows both the blue subpixels and the white subpixels to use the same source wiring layer 16, and the division position of the common electrode wiring layer 14 in the direction of the source wiring layer 16 (Y direction) to form the zigzag shape passing between the red subpixel and the blue subpixel. The division position of the common electrode wiring layer 14 in the direction of the source wiring layer 16 is not located between the white subpixel and the blue subpixel. The division positions of the common electrode wiring layer 14 in the direction of the gate wiring layer (X direction) are located at points between the white subpixel on the first line L1 and the blue subpixel on the second line L2, the blue subpixel on the second line L2 and the white subpixel on the third line L3, the white subpixel on the third line L3 and the blue subpixel on the fourth line, and the blue subpixel on the fourth line L4 and the white subpixel on the fifth line L5. The division region 20 is formed to have the zigzag shape having the width corresponding to 3 subpixels in the X direction microscopically, and extends along the Y direction macroscopically. The single divided part of the common electrode wiring layer 14 includes 12 subpixels (4 pixels) in the X direction.

Referring to FIG. 9B, the section A represents the state where the CF glass substrate displaces to the right, and the section B represents the state where the CF glass substrate displaces to the left. The states AR and BR represent the liquid crystal display device seen from the right side, the states AC and BC represent the liquid crystal display device seen from the front, and the states AL and BL represent the liquid crystal display device seen from the left side. The states A1 and B1 represent the display device resulting from assembly displacement upon application of the white voltage only to the red subpixxels, the states A2 and B2 represent the display device resulting from assembly displacement upon application of the white voltage only to the green subpixels, and the states A3 and B3 represent the display device resulting from assembly displacement upon application of the white voltage only to the blue subpixels. Referring to FIG. 9B, in the state defined by A1 and AR, the blue vertical stripes appear on the red screen in the condition R+B. In the state defined by B3 and BL, the red vertical stripes appear on the blue screen in the condition B+R. The division positions are arranged to form the zigzag shape like this embodiment, which makes it possible to reduce the light leakage amount resulting from the color mixture at viewing angle to be smaller than the second comparative example by ½. Accordingly, it is possible to lessen the visibility of the color mixture part at viewing angle compared with the second comparative example.

Preferably, the common electrode wiring layer 14 is divided at the point located between the red and the blue subpixels where the leakage of light, if any, is unlikely to be recognized as the color mixture because of small amount of transmitted light. Assuming that the pixel structure includes the four-color subpixels of RGBW, allowing the blue and white subpixels to use the same source wiring layer 16, the linear division of the common electrode wiring layer between the red and the blue subpixels may contain the side part of the white subpixels with high transmittance. When the common electrode wiring layer 14 is divided at the side of the white subpixel with higher transmittance than the green subpixel, the color mixture at viewing angle markedly appears if the light leaks. The division may be made at the point between the red and the blue subpixels to form the zigzag shape so as to avoid the white subpixel, resulting in the lessened color mixture at viewing angle. If the common electrode wiring layer 14 is linearly divided likewise the second comparative example, it is preferable to perform the division at the point between the red and the green subpixels likewise the second comparative example for avoiding the side part of the white subpixel.

Having been described with respect to the present invention by the applicant in reference to the embodiments, examples and modified example, the present invention is not limited to those embodiments and the modified examples, which can be modified in various manners.

What is claimed is:

1. A display device including a plurality of first pixels, comprising:
    a first substrate; and
    a second substrate,
    wherein the first substrate includes a gate wiring extending in a first direction, a plurality of source wirings arranged in the first direction, each extending in a second direction that is different from the first direction, a common electrode extending in the second direction, which is separated into a plurality of parts each with a predetermined pixel width in the first direction, and a plurality of metal wirings arranged in the first direction, each extending in the second direction;
    each of the first pixels includes a first color subpixel, a second color subpixel, and a third color subpixel, which are arranged in a sequence along the first direction;
    the source wirings include a first wiring and a plurality of second wirings which are positioned at both sides of the first wiring;
    a separation region of the common electrode is positioned between the first color subpixel and the second color subpixel, which is located at a part above the first wiring,
    the metal wiring is disposed on the common electrode in contact therewith and is disposed above a part of the second wirings,
    the common electrode is a transparent conductive film, and the metal wiring is a light shielding conductive film.

2. The display device according to claim 1, wherein the division region has a rectangular shape in planar view, extending in the second direction, and a width smaller than that of the metal wiring.

3. The display device according to claim 1, wherein a distance between adjacent metal wirings which interpose the first color and the second color subpixels is larger than the distances between adjacent metal wirings which interpose the second color and the third color subpixels, and the distance between adjacent metal wirings which interpose the third color and the first color subpixels.

4. The display device according to claim 1,
    wherein a part of the common electrode, having a first pixel line disposed in the first direction is divided to locate a division region at a position between the first color and the second color subpixels at intervals of predetermined numbers of the subpixels;
    a part of the common electrode, having a second pixel line disposed in the first direction adjacent to the first pixel line is divided to locate the division region at a position between the second color and the third color subpixels at intervals of predetermined numbers of the subpixels;
    a part of the common electrode, having a third pixel line disposed in the first direction adjacent to the second pixel line is divided to locate the division region at a position between the third color and the first color subpixels at intervals of predetermined numbers of the subpixels;
    a part of the common electrode, having a fourth pixel line disposed in the first direction adjacent to the third pixel line is divided to locate the division region at a position between the second color and the third color subpixels at intervals of predetermined numbers of the subpixels;
    a part of the common electrode, having a fifth pixel line disposed in the first direction adjacent to the fourth pixel line is divided to locate the division region at a position between the first color and the second color subpixels at intervals of predetermined numbers of the subpixels, and
    the division region has a shape in planar view macroscopically as a straight line extending in the second direction, and microscopically as a zigzag line extending in the first and the second directions.

5. The display device according to claim 1,
    wherein a part of the common electrode, having a first pixel line disposed in the first direction is divided to locate the division region at a position between the first color and the second color subpixels at intervals of predetermined numbers of the subpixels;

a part of the common electrode, having a second pixel line disposed in the first direction adjacent to the first pixel line is divided to locate the division region at a position between the second color and the third color subpixels at intervals of predetermined numbers of the subpixels;

a part of the common electrode, having a third pixel line disposed in the first direction adjacent to the second pixel line is divided to locate the division region at a position between the third color and the first color subpixels at intervals of predetermined numbers of the subpixels;

a part of the common electrode, having a fourth pixel line disposed in the first direction adjacent to the third pixel line is divided to locate the division region at a position between the first color and the second color subpixels at intervals of predetermined numbers of the subpixels;

a part of the common electrode, having a fifth pixel line disposed in the first direction adjacent to the fourth pixel line is divided to locate the division region at a position between the second color and the third color subpixels at intervals of predetermined numbers of the subpixels, and the division region has a shape in planar view macroscopically as a straight line extending in an oblique direction, and microscopically as a zigzag line extending in the first and the second directions.

6. The display device according to claim 1, wherein the second substrate includes a detection electrode wiring which extends in the first direction, and the common electrode functions as a drive electrode wiring of an in-cell type touch panel.

7. The display device according to claim 1, wherein the second substrate includes a first color layer, a second color layer and a third color layer corresponding to the subpixels of the first color, the second color and the third color, and black matrices each interposed between the respective layers of the first, the second and the third color layers.

8. The display device according to claim 1, wherein the first color is blue, the second color is red, and the third color is green.

9. A display device including a plurality of pixels, comprising:

a first substrate;

a second substrate; and a liquid crystal layer interposed between the first and the second substrates, wherein each of the pixels includes a first subpixel, a second subpixel and a third subpixel which are arranged in a sequence along a first direction;

the first, the second and the third subpixels are disposed at a plurality of positions in a second direction different from the first direction;

the first substrate includes a source wiring extending in the second direction, a common electrode extending in the second direction, which is separated into parts each having a predetermined length in the first direction, and a metal wiring layer extending in the second direction;

the second substrate includes a first detection electrode;

the common electrode is a transparent conductive film;

the metal wiring is a light shielding conductive film;

the common electrode is used for pixels in common disposed at a plurality of positions in the second direction;

the common electrode functions as a second detection electrode;

a separation region of the common electrode is disposed on the source wiring between the first and the second subpixels; and the metal wiring is disposed on the common electrode above the source wiring.

10. The display device according to claim 9, wherein the first, the second and the third subpixels are arranged at a plurality of positions in the second direction, and the separation regions each having a rectangular shape in planar view extending in the second direction are located at a plurality of positions between the first and the second subpixels.

11. The display device according to claim 10, wherein a distance between adjacent metal wirings which interpose the separation region is larger than the distance between other adjacent metal wiring.

12. The display device according to claim 10, wherein a distance between the metal wiring positioned between the third and the first subpixels and the metal wiring positioned between the second and the third subpixels is larger than the distance between the metal wiring positioned between the second and the third subpixels and the metal wiring positioned between the third and the first subpixels.

13. The display device according to claim 9, wherein the second substrate includes a first color layer, a second color layer and a third color layer corresponding to the first, the second, and the third subpixels, and black matrices each interposed between the respective layers of the first, the second, and the third color layers.

14. The display device according to claim 9, wherein the first subpixel is blue, the second subpixel is red and the third subpixel is green.

* * * * *